United States Patent
Struck et al.

(10) Patent No.: US 7,408,004 B2
(45) Date of Patent: Aug. 5, 2008

(54) WATER SOLUBLE-POLYMER DISPERSION AND METHOD OF PRODUCING A WATER-SOLUBLE POLYMER DISPERSION

(75) Inventors: Oliver Struck, Düren (DE); Christian Przybyla, Duisburg (DE); Werner Jaeger, Kleinmachnow (DE); Mathias Hahn, Wilhelmshorst (DE); Dirk Ruppelt, Potsdam (DE)

(73) Assignee: Akzo Nobel N.V., Arnhem (NL)

( * ) Notice: Subject to any disclaimer, the term of this patent is extended or adjusted under 35 U.S.C. 154(b) by 385 days.

(21) Appl. No.: 10/514,854

(22) PCT Filed: May 15, 2003

(86) PCT No.: PCT/SE03/00793

§ 371 (c)(1), (2), (4) Date: Apr. 7, 2005

(87) PCT Pub. No.: WO03/097703

PCT Pub. Date: Nov. 27, 2003

(65) Prior Publication Data

US 2005/0182181 A1 Aug. 18, 2005

(30) Foreign Application Priority Data

May 15, 2002 (DE) ................. 102 21 584
May 15, 2002 (DE) ................. 102 21 585

(51) Int. Cl.
*C08F 2/16* (2006.01)

(52) U.S. Cl. ............... 524/815; 524/458; 524/555; 524/556; 524/813

(58) Field of Classification Search ......... 524/458, 524/555, 556, 813, 815
See application file for complete search history.

(56) References Cited

U.S. PATENT DOCUMENTS

| 5,403,883 A | 4/1995 | Messner et al. |
| 5,447,981 A | 9/1995 | Fock et al. |
| 5,597,859 A | 1/1997 | Hurlock et al. |
| 5,840,804 A | 11/1998 | Carl et al. |
| 6,075,089 A | 6/2000 | Jaeger et al. |
| 6,133,363 A | 10/2000 | Jaeger et al. |
| 6,171,505 B1 | 1/2001 | Maury et al. |
| 6,235,205 B1 | 5/2001 | Huang et al. ........... 210/723 |
| 6,517,677 B1 * | 2/2003 | Cardile et al. ........... 162/168.3 |
| 6,702,946 B1 | 3/2004 | Huang et al. ........... 210/723 |
| 7,034,068 B1 * | 4/2006 | Negele et al. ........... 524/45 |

FOREIGN PATENT DOCUMENTS

| EP | 0 664 302 A2 | 7/1995 |
| EP | 0 664 302 A3 | 7/1995 |
| EP | 0 664302 B1 | 7/1995 |
| WO | WO 01/81252 A1 | 11/2001 |
| WO | WO 02/38639 A1 | 5/2002 |

OTHER PUBLICATIONS

International Preliminary Examination Report PCT/SE 03/00793 dated Sep. 15, 2004.
Derwent Abstract No. 010363315 abstracting EP 0 664302. Jul. 1995.
Derwent Abstract No. 010363315 abstracting EP 0 664302 A2 & A3, Jul. 1995.
Madsen, F. et al., "Complexation graft copolymer networks: swelling properties, calcium binding and proteolytic enzyme inhibition," Biomaterials, vol. 20 (1999) pp. 1701-1708.

* cited by examiner

*Primary Examiner*—Helen L. Pezzuto
(74) *Attorney, Agent, or Firm*—Michelle J. Burke; Robert C. Morriss

(57) ABSTRACT

The present invention relates to a water-soluble polymer dispersion comprising: a dispersed polymer made up of at least one water-soluble monomer A and at least one water-soluble cationic monomer B, at least one stabiliser C, and at least one cationic polyelectrolyte as co-stabiliser D. It also relates to a method of producing a polymer dispersion and to a papermaking process.

31 Claims, No Drawings

WATER SOLUBLE-POLYMER DISPERSION AND METHOD OF PRODUCING A WATER-SOLUBLE POLYMER DISPERSION

This application claims priority of PCT Application No. PCT/SE03/100793, filed May 15, 2003, German Patent Application No. 10221585.5, filed May 15, 2002, and German Patent Application No. 10221584.7, filed May 15, 2002.

The present invention relates to a new polymer dispersion and a method of producing a polymer dispersion. It also relates to a paper-making process.

Cationic polymers, in particular copolymers based on acrylamide, are used commercially on a large scale as process aids for the implementation of separation processes during water processing and waste water treatment, in the coal and ore industry, in particular however in the paper industry in order to improve retention and accelerate de-watering.

The radical polymerisation of commercially relevant cationic monomers, such as for example diallyldimethylammonium chloride (DADMAC), (meth-) acryloyloxyethyltrimethylammonium chloride (MADAM or ADAM), (meth-) acryloyloxyethylbenzyldimethylammonium chloride (MADAMBQ or ADAMBO), or trimethylmethacrylamidopropylammonium chloride (TMAPMA) leads to water-soluble cationic polymers, so-called cationic polyelectrolytes. In contrast, a most extensively non-ionic water-soluble polymer results from the radical polymerisation of acrylamide. The co-polymerisation of acrylamide with cationic monomers leads to the formation of co-polymers with different charge density, which is dependent upon the proportion of the cationic monomer used for the co-polymerisation, which is incorporated in the polymer chain.

According to the state of the art, the production of these polymers is effected by radical polymerisation in homogeneous, aqueous solution or in heterogeneous phase.

U.S. Pat. No. 5,403,883 describes the production of aqueous dispersions of water-soluble polymers, formed by polymerisation of a mixture comprising water-soluble, hydrophobic and possibly amphiphilic monomers in the presence of a polymeric dispersing agent.

EP 0 664 302 discloses a process for the production of water-soluble polymer dispersions.

There is an object of the present invention to provide a water-soluble dispersion of a water-soluble polymer which can show a combination of beneficial properties such as low viscosity, a high active content of polymer, and/or a high molecular weight of the polymer. The polymer can also be produced without the use of hydrophobic or amphiphilic monomers.

This object is achieved by a water-soluble polymer dispersion comprising a dispersed polymer made up of at least one water-soluble monomer A and at least one water-soluble cationic monomer B, at least one polymer stabiliser C, and at least one cationic polyelectrolyte as a co-stabiliser D.

There is a further object of the present invention to provide a method which renders it possible production of an aqueous polymer dispersion which has a low viscosity, a high active content of polymer, a high molecular weight of the polymer. At the same time, the dispersion should suitably be producible in as simple a manner as possible, and suitably in the absence of hydrophobic or amphiphilic monomers.

This object is achieved by a method of producing an aqueous polymer dispersion comprising polymerising at least one water-soluble monomer A and at least one water-soluble cationic monomer B in an aqueous solution in the presence of a polymer stabiliser C and a co-stabiliser D. The method is suitably implemented in one stage, by which is herein meant that the above-described monomers reacting are converted in one step. The method is suitably implemented in a salt-free reaction medium.

By "active content" is herein meant the total content of dispersed polymer and stabilisers, including co-stabilisers.

Suitably, the water-soluble polymer dispersion comprises from about 50 to about 99 mole % of the at least one water-soluble monomer A, preferably from about 75 to about 99 mole %, most preferably from about 85 to about 92 mole %, and suitably from about 1 to about 50 mole % of the at least one water-soluble cationic monomer B, preferably from about 1 to about 25 mole %, most preferably from about 8 to about 15 mole %, relative respectively to the molecular weight of the polymer.

The molar ratio between monomer A and monomer B is suitably from about 99:1 to about 50:50, preferably from about 95:5 to about 75:25, most preferably from about 92:8 to about 85:15.

Suitably, the water-soluble polymer dispersion comprises from about 0.05 to about 10 weight % of the polymer stabiliser C, preferably from about 0.1 to about 5 weight %, most preferably from about 0.5 to about 2 weight %, relative to the total mass of the dispersion.

Suitably, the aqueous polymer dispersion comprises up to about 25 weight % of the co-stabiliser D, preferably from about 1 to about 25 weight %, most preferably from about 3 to about 15 weight %, relative respectively to the total mass of the dispersion.

Suitably, the aqueous polymer dispersion comprises from about 1 to about 50% by weight of the dispersed polymer, preferably from about 5 to about 40% by weight, most preferably from about 10 to about 30% by weight, relative to the total mass of the dispersion.

The weight average molecular weight of the dispersed polymer is suitably at least 1.000.000 g/mole, suitably from about 1.000.000 to about 15.000.000 g/mole, preferably from about 3.000.000 to about 10.000.000 g/mole, most preferably from about 4.000.000 to about 7.000.000 g/mole.

The total mass of the dispersion is defined as the mass of all components in the dispersion, including water.

Suitably, the mass ratio of stabilisers and co-stabilisers to the polymer in the aqueous polymer dispersion (C+D)/(A+B), is <1, also suitably from about 0.01 to about 1, preferably <0.8, also preferably from about 0.1 to about 0.8 most preferably <0.6, also most preferably from about 0.3 to about 0.6.

According to one embodiment of the invention, the water-soluble polymer dispersion comprises from about 1 to about 25 weight % of a polymer having an average molecular weight $M_w$ of at least $10^6$ g/mol made up of from about 75 to about 99 mole % of at least one water-soluble monomer A and from about 1 to about 25 mole % of at least one water-soluble cationic monomer B, relative respectively to the molecular weight of the polymer, from about 0.1 to about 5 weight % of at least one copolymer with block structure as polymer stabiliser C, from about 1 to about 25 weight % of at least one cationic polyelectrolyte as co-stabiliser D, and, up to 100 weight % additional proportions of water, relative respectively to the total mass of the dispersion, wherein the mass ratio of stabilisers and co-stabilisers to the polymer is (C+D)/(A+B)<1.

The water-soluble monomers, A and B, suitably comprise vinyl monomers, preferably the water-soluble monomer A is a non-ionic monomer, and the water-soluble monomer B is a cationic monomer. The non-ionic monomer A is preferably a compound of the general formula I:

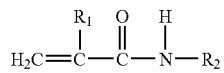

with $R_1$=H, or methyl, $R_2$=H, methyl, ethyl, isopropyl, methyloyl, hydroxyethyl, or 2-hydroxypropyl. Preferred monomers A include acrylamide, methacrylamide, N-isopropylacrylamide, N-isopropylmethacrylamide, N-t-butylacrylamide, N-t-butylmethacrylamide, N-methylolacrylamide, and N-methylolmethacrylamide. Most preferably, the monomer A is acrylamide or methacrylamide.

The monomer B is suitably a compound of the general formula II:

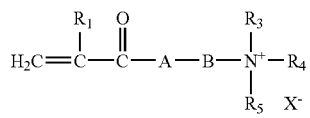

with $R_1$=H, or methyl, $R_3$, $R_4$, $R_5$=independently of each other H, alkyl ($C_1$-$C_8$), benzyl or alkylbenzyl, A=NH, or O, B=alkyl ($C_1$-$C_{10}$) or hydroxyalkyl ($C_1$-$C_{10}$), and, $X^-$=an anionic counterion, suitably a monovalent anion, e.g. halogen such as chloride, or methyl sulphate. Preferred monomers B include acryloyl-oxyethyl-trimethylammoniumchloride (ADAM-MQ), acryloyloxyethyl-benzyldimethyl-ammoniumchloride (ADAM-BQ), methacryloyloxyethyl-trimethylammoniumchloride (MADAM), methacryloyl-oxyethyl-benzyldimethylammonium-chloride (MADAM-BQ), acrylamidopropyl-trimethylammoniumchloride (TMA-PAA), acrylamidopropyl-benzyl-dimethylammoniumchloride (BDMAPM), methacryl-amidopropyl-trimethylammonium-chloride (TMAPMA), and methacrylamidopropyl-benzyldimethylammoniumchloride (BDMAPMA).

The present polymer formed from monomers A and B can be prepared in the absence of hydrophobic and amphiphilic monomers. However, hydrophobic and amphiphilic monomers can, of coarse, also be present. Examples of suitable hydrophobic monomers include: styrene, alpha.-methylstyrene, p-methylstyrene, p-vinyltoluene, vinylcyclopentane, vinylcyclohexane, vinylcyclooctane, isobutene, 2-methylbutene-1, hexene-1,2-methylhexene-1,2-propylhexene-1, ethyl(meth)acrylate, propyl(meth)acrylate, isopropyl(methy) acrylate, butyl(meth)arylate, isobutyl(meth)acrylate, pentyl (meth)acrylate, hexyl(meth)acrylate, heptyl(meth)acrylate, octyl(meth)acrylate, cyclopentyl(meth)acrylate, cyclohexyl (meth)acrylate, 3,3,5-trimethylcyclohexyl(meth)acrylate, cyclooctyl(meth)acrylate, phenyl(meth)acrylate, 4-methylphenyl(meth)acrylate, 4-methoxyphenyl(meth)acrylate. Furthermore, ethylene, vinylidene chloride, vinylidene fluoride, vinyl chloride or other predominantly (ar)aliphatic compounds with polymerizable double bonds can be used. Examples of preferred hydrophobic monomers include: ethyl (meth)acrylate, propyl(meth)acrylate, isopropyl(methy) acrylate, butyl(meth)arylate, isobutyl(meth)acrylate, pentyl (meth)acrylate, hexyl(meth)acrylate, heptyl(meth)acrylate, octyl(meth)acrylate, cyclopentyl(meth)acrylate, cyclohexyl (meth)acrylate, 3,3,5-trimethylcyclohexyl(meth)acrylate, cyclooctyl(meth)acrylate, phenyl(meth)acrylate, 4-methylphenyl(meth)acrylate, and 4-methoxyphenyl(meth)acrylate. The amount of hydrophobic monomers is suitably less than 5 mole %, preferably less than 1 mole % in the dispersed polymer.

The polymer stabiliser C is suitably a co-polymer made up from at least one monomer which is diallyldimethylammonium chloride (DADMAC), vinylpyridinium chloride, N-vinylimidazoline chloride, vinylbenzyltrimethylammonium chloride or mixtures thereof, and/or compounds of the general formula II, and at least one compound of at least one of the general formulas III, IV, and V. In one embodiment of the invention, the polymer stabiliser C is suitably a random co-polymer. In this case, the polymer stabiliser C suitably comprises a monomer unit originating from a compound of at least one of the general formulas III or V. In another embodiment of the invention, the polymer stabiliser C is suitably a block co-polymer. In this case, the polymer stabiliser C suitably comprises a monomer unit originating from a compound of the general formula IV. In this case, the polymer stabiliser C may also comprise monomer units originating from compounds of the general formulas III and/or V.

A compound of the general formula III is a monofunctionally allyl-terminal polyether:

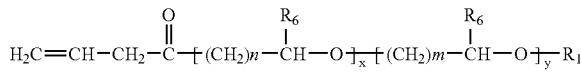

with $R_1$=H, or methyl, $R_6$=independently of each other H, methyl, or ethyl, n=1 or 3, m=1 to 3, x=5 to 50, and y=5 to 50.

A compound of the general formula IV is a macroinitiator:

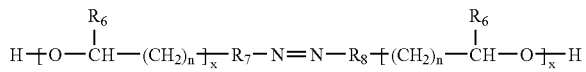

with $R_1$=H, or methyl, $R_6$=independently of each other H, methyl, or ethyl, $R_7$, $R_8$=independently of each other alkyl, cyanoalkyl, or carbalkoxyalkyl, ($C_1$-$C_8$), n=1 or 3 and x=5 to 100.

A compound of the general formula V is a monofunctionally vinyl-terminal polyether:

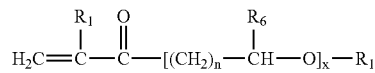

with $R_1$=H, or methyl, $R_8$=H, methyl, or ethyl, n=1 or 3 and x=5 to 50.

The polymer stabiliser C may also be a mixture of the above-mentioned co-polymers.

The polymer stabiliser C suitably comprises from about 80 to about 99.9 mole % of monomer(s) which is/are belonging to the group of cationic monomers II, preferably from about 90 to about 99 mole %, most preferably from about 92 to about 98.5 mole %.

The polymer stabiliser C suitably comprises from about 0.1 to about 20 mole % of monomer(s) belonging to the general formulas IV, V, and VI, preferably from about 1 to about 10 mole %, most preferably from about 1.5 to about 8 mole %.

The polymer stabiliser C suitably has a molecular weight of from about 20.000 to about 3.000.000 g/mole, preferably from about 100.000 to about 2.000.000 g/mole, most preferably from about 200.000 to about 800.000 g/mole.

The co-stabiliser D is suitably a cationic polyelectrolyte or a cationic polymer. Examples of suitable co-stabilisers D are polymers and co-polymers of DADMAC, N-trimethylamomiumpropyleacrylamide, acryloylethyltrimethylammoniumchloride, methacryloylethyltrimethylammoniumchloride, ADAM BQ, and vinylpyridine. Preferably, DADMAC or N-trimethylamomiumpropyleacrylamide, most preferably DADMAC. Optionally, in combination with non-ionic monomers such as (meth)acrylamide. Further examples of suitable co-stabilisers D are polyethylenimine, and polyamines.

The co-stabiliser D suitably has a molecular weight of from about 1.000 to about 500.000 g/mole, preferably from about 2.000 to about 100.000 g/mole, most preferably from about 3.000 to about 10.000 g/mole. The co-stabiliser D can also be a mixture of different cationic polyelectrolytes with the above-mentioned molecular weight.

The aqueous polymer dispersion is suitably a salt-free dispersion. By "salt-free" is herein meant that no substantial amount of an inorganic polyvalent anion salt is present. By "substantial amount" is herein suitably meant less than about 1 weight %, preferably less than 0.5 weight %, most preferably less than 0.1 weight %.

The water-soluble polymer dispersions of the invention show a comparatively low viscosity also at comparatively high active contents. This leads to a substantial improvement in the ability to handle and process polymer dispersions. The Brookfield viscosity at 25° C. of the water-soluble polymer dispersion is suitably from about 100 to about 10.000 mPas, preferably from about 500 to about 5.000 mPas, most preferably from about 1.000 to about 3.000 mPas.

The hydrophilic-hydrophobic balance of the polymer stabiliser C or stabiliser mixtures is suitably optimized in respect to the co-stabiliser used or the co-stabiliser mixture used.

The method suitably comprises polymerisation in a salt-free reaction medium. The polymerisation is suitably implemented in the presence of a radical initiator. Suitably, a water-soluble peroxide or a water-soluble azo initiator is used as radical initiator such as e.g. V50, VA044 (Firm Wako). The amount of initiator in the reaction mixture is suitably from about $10^{-5}$ to about 1 weight %, preferably from about $10^{-4}$ to about $10^{-1}$ weight % with respect to the total mass of the dispersion. The initiator can be added in total at the beginning of the polymerisation, but it is also possible that dosing is effected over the entire course of the polymerisation. In a similar manner, the monomers A) and B) can be added in total or as an inflow over the entire course of the polymerisation. The polymerisation temperature is suitably from about 0 to about 100° C., preferably from about 40 to about 80° C.

Preferably, the method is implemented under protective gas, e.g. an argon atmosphere. The final conversion is suitably above 99 weight %, preferably above 99.9 weight %, with respect to monomers A and B. The reaction duration is suitably from about 1 to about 24 hours.

The present invention further relates to a water-soluble polymer dispersion obtainable by a method as described above.

The water-soluble polymer dispersions are suitably used in large scale as process aids for the implementation of separation processes in water processing and waste water treatment, in the coal and ore industry, in particular however in the paper industry in order to improve the retention and in order to accelerate de-watering.

Thus, the invention further relates to the use of a polymer dispersion as retention aid for paper manufacturing, as thickening agent and/or as soil improvement agent. The preferred absence of organic solvents ensures safe handling and an ecologically safe use of the polymer dispersion according to the invention, e.g. as retention means for paper production.

Finally, the present invention comprises a process for the production of paper from an aqueous suspension containing cellulosic fibres, and optional fillers, which comprises adding to the suspension a water-soluble polymer dispersion according to the invention, forming and draining the suspension on a wire. Suitably, one or more additional components can be added to the suspension. Examples of such additional components include anionic organic particles, e.g. silica-based particles and bentonite, and anionic as well as cationic polymers.

The subject according to the invention is now intended to be explained in more detail with reference to the following examples without restricting said subject to the breadth of these embodiments.

EXAMPLES

Example 1

142 g 50% aqueous AAM solution, 37 g 80% aqueous ADAM-BQ solution, 10 g stabiliser poly-DADMAC, block copolyether-modified (HLB 6.9, 10 mole %), 200 g 30% aqueous poly-TMAPMA solution, 5 g 10% EDTA solution, 10 g glycerine and 595 g water are degassed in a reactor with argon and heated to 50° C. during agitation. Next, 1 ml 1% aqueous V50 solution is added. After 6 hours, the temperature is increased to 60° C. and 3 ml 10% V50 solution are added. The polymerisation is ended after a further 2 hours.

Example 2

142 g 50% aqueous Mm solution, 37 g 80% aqueous ADAM-BQ solution, 10 g stabiliser poly-(DADMAC/ADAM-MQ/PEG-acrylate) (45/45/10 mole %), 200 g 30% aqueous poly-TMAPMA solution, 5 g 10% EDTA solution, 10 g glycerine and 595 g water are degassed in a reactor with argon and heated to 50° C. during agitation. Next, 1 ml 1% aqueous V50 solution is added. After 6 hours, the temperature is increased to 60° C. and 3 ml 10% V50 solution are added. The polymerisation is ended after a further 2 hours.

Example 3

142 g 50% aqueous AAm solution, 37 g 80% aqueous ADAM-BQ solution, 5 g stabiliser poly-DADMAC, block copolyether-modified (HLB 6.9, 10 mole %), 5 g stabiliser poly-(DADMAC/ADAM-MQ/PEG-acrylate) (45/45/10 mole %), 200 g 30% aqueous poly-TMAPMA solution, 5 g 10% EDTA solution, 10 g glycerine and 595 g water are degassed in a reactor with argon and heated to 50° C. during agitation. Next, 1 ml 1% aqueous V50 solution is added. After 6 hours, the temperature is increased to 60° C. and 3 ml 10% V50 solution are added. The polymerisation is ended after a further 2 hours.

Example 4

142 g 50% aqueous AAm solution, 37 g 80% aqueous ADAM-BQ solution, 10 g stabiliser poly-DADMAC, block copolyether-modified (HLB 6.9, 10 mole %), 150 g 40% aqueous poly-DADMAC solution, 5 g 10% EDTA solution, 10 g glycerine and 645 g water are degassed in a reactor with argon and heated to 50° C. during agitation. Next, 1 ml 1% aqueous V50 solution is added. After 6 hours, the temperature is increased to 60° C. and 3 ml 10% V50 solution are added. The polymerisation is ended after a further 2 hours.

Example 5

142 g 50% aqueous AAm solution, 37 g 80% aqueous ADAM-BQ solution, 10 g stabiliser poly-DADMAC, block copolyether-modified (HLB 6.9, 10 mole %), 150 g 40% aqueous poly-DADMAC solution, 5 g 10% EDTA solution, 10 g glycerine and 645 g water are degassed in a reactor with argon and heated to 50° C. during agitation. Next, 1 ml 1% aqueous V50 solution is added. After 6 hours, the temperature is increased to 60° C. and 3 ml 10% V50 solution are added. The polymerisation is ended after a further 2 hours.

Example 6

142 g 50% aqueous AAm solution, 37 g 80% aqueous ADAM-BQ solution, 5 g stabiliser poly-DADMAC, block copolyether-modified (HLB 6.9, 10 mole %), 5 g stabiliser poly-(DADMAC/ADAM-MQ/PEG-acrylate) (45/45/10 mole %), 150 g 40% aqueous poly-DADMAC solution, 5 g 10% EDTA solution, 10 g glycerine and 645 g water are degassed in a reactor with argon and heated to 50° C. during agitation. Next, 1 ml 1% aqueous V50 solution is added. After 6 hours, the temperature is increased to 60° C. and 3 ml 10% V50 solution are added. The polymerisation is ended after a further 2 hours.

Example 7

142 g 50% aqueous AAm solution, 37 g 80% aqueous ADAM-BQ solution, 5 g stabiliser poly-DADMAC, block copolyether-modified (HLB 6.9, 10 mole %), 5 g stabiliser poly-(DADMAC/ADAM-MQ) (70/30 mole %), 150 g 40% aqueous poly-DADMAC solution, 5 g 10% EDTA solution, 10 g glycerine and 645 g water are degassed in a reactor with argon and heated to 50° C. during agitation. Next, 1 ml 1% aqueous V50 solution is added. After 6 hours, the temperature is increased to 60° C. and 3 ml 10% V50 solution are added. The polymerisation is ended after a further 2 hours.

Example 8

142 g 50% aqueous AAm solution, 37 g 80% aqueous ADAM-BQ solution, 5 g stabiliser poly-DADMAC, block copolyether-modified (HLB 6.9, 10 mole %), 5 g stabiliser poly-(DADMAC/ADAM-MQ) (50/50 mole %), 150 g 40% aqueous poly-DADMAC solution, 5 g 10% EDTA solution, 10 g glycerine and 645 g water are degassed in a reactor with argon and heated to 50° C. during agitation. Next, 1 ml 1% aqueous V50 solution is added. After 6 hours, the temperature is increased to 60° C. and 3 ml 10% V50 solution are added. The polymerisation is ended after a further 2 hours.

Example 9

142 g 50% aqueous AAm solution, 37 g 80% aqueous ADAM-BQ solution, 5 g stabiliser poly-DADMAC, block copolyether-modified (HLB 56.9, 10 mole %), 5 g stabiliser poly-(DADMAC/ADAM-MQ) (70/30 mole %), 200 g 30% aqueous poly-TMAPMA solution, 5 g 10% EDTA solution, 10 g glycerine and 595 g water are degassed in a reactor with argon and heated to 50° C. during agitation. Next, 1 ml 1% aqueous V50 solution is added. After 6 hours, the temperature is increased to 60° C. and 3 ml 10% V50 solution are added. The polymerisation is ended after a further 2 hours.

Example 10

142 g 50% aqueous AAm solution, 37 g 80% aqueous ADAM-BQ solution, 5 g stabiliser poly-DADMAC, block copolyether-modified (HLB 6.9, 10 mole %), 5 g stabiliser poly-(DADMAC/ADAM-MQ) (50/50 mole %), 200 g 30% aqueous poly-TMAPMA solution, 5 g 10% EDTA solution, 10 g glycerine and 695 g water are degassed in a reactor with argon and heated to 50° C. during agitation. Next, 1 ml 1% aqueous V50 solution is added. After 6 hours, the temperature is increased to 60° C. and 3 ml 10% V50 solution are added. The polymerisation is ended after a further 2 hours.

Example 11

213 g 50% aqueous AAm solution, 45 g 80% aqueous ADAM-BQ solution, 5 g stabiliser poly-DADMAC, block copolyether-modified (HLB 6.9, 10 mole %), 5 g stabiliser poly-(DADMAC/ADAM-MQ) (70/30 mole %), 200 g 30% aqueous poly-TMAPMA solution, 5 g 10% EDTA solution, 10 g glycerine and 505.5 g water are degassed in a reactor with argon and heated to 50° C. during agitation. Next, 1 ml 1% aqueous V50 solution is added. After 1, 2, 3, 4, 5 hours, respectively 2.1 g 80% aqueous ADAM-BQ solution are added in doses. After 6 hours, the temperature is increased to 60° C. and 3 ml 10% V50 solution are added. The polymerisation is ended after a further 2 hours.

Example 12

213 g 50% aqueous AAm solution, 45 g 80% aqueous ADAM-BQ solution, 5 g stabiliser poly-DADMAC, block copolyether-modified (HLB 6.9, 10 mole %), 5 g stabiliser poly-(DADMAC/ADAM-MQ/PEG-acrylate) (45/45/10 mole %), 150 g 40% aqueous poly-DADMAC solution, 5 g 10% EDTA solution, 10 g glycerine and 555.5 g water are degassed in a reactor with argon and heated to 50° C. during agitation. Next, 1 ml 1% aqueous V50 solution is added. After 1, 2, 3, 4, 5 hours, respectively 2.1 g 80% aqueous ADAM-BQ solution are added in doses. After 6 hours, the temperature is increased to 60° C. and 3 ml 10% V50 solution are added. The polymerisation is ended after a further 2 hours.

Example 13

213 g 50% aqueous AAm solution, 45 g 80% aqueous ADAM-BQ solution, 5 g stabiliser poly-DADMAC, block copolyether-modified (HLB 6.9, 10 mole %), 5 g stabiliser poly-(DADMAC/ADAM-MQ/PEG-acrylate) (45/45/10 mole %), 112.5 g 40% aqueous poly-DADMAC solution, 150 g 30% aqueous poly-TMAPMA solution, 5 g 10% EDTA solution, 10 g glycerine and 443 g water are degassed in a reactor with argon and heated to 50° C. during agitation. Next, 1 ml 1% aqueous V50 solution is added. After 1, 2, 3, 4, 5 hours, respectively 2.1 g 80% aqueous ADAM-BQ solution are added in doses. After 6 hours, the temperature is increased to 60° C. and 3 ml 10% V50 solution are added. The polymerisation is ended after a further 2 hours.

Example 14

213 g 50% aqueous AAm solution, 45 g 80% aqueous ADAM-BQ solution, 5 g stabiliser poly-DADMAC, block copolyether-modified (HLB 6.9, 10 mole %), 5 g stabiliser poly-(DADMAC/ADAM-MQ) (70/30 mole %), 112.5 g 40% aqueous poly-DADMAC solution, 150 g 30% aqueous poly-TMAPMA solution, 5 g 1% EDTA solution, 10 g glycerine and 443 g water are degassed in a reactor with argon and heated to 50° C. during agitation. Next, 1 ml 1% aqueous V50 solution is added. After 1, 2, 3, 4, 5 hours, respectively 2.1 g 80% aqueous ADAM-BQ solution are added in doses. After 6 hours, the temperature is increased to 60° C. and 3 ml 10% V50 solution are added. The polymerisation is ended after a further 2 hours.

Example 15

142 g 50% aqueous AAM solution, 37 g 80% aqueous ADAM-BQ solution, 10 g stabiliser poly-DADMAC, block copolyether-modified (HLB 6.9, 10 mole %), 200 g 30% aqueous poly-TMAPMA solution, 5 g 10% EDTA solution, 10 g glycerine and 595 g water are degassed in a reactor with argon and heated to 50° C. during agitation. Next, 1 ml 1% aqueous V50 solution is added. After 6 hours, the temperature is increased to 60° C. and 3 ml 10% V50 solution are added. The polymerisation is ended after a further 2 hours.

Example 16

142 g 50% aqueous AAm solution, 37 g 80% aqueous ADAM-BQ solution, 10 g stabiliser poly-(ADAM-MQ/ADAM-BQ)-b-PEG, 200 g 30% aqueous poly-TMAPMA solution, 5 g 10% EDTA solution, 10 g glycerine and 595 g water are degassed in a reactor with argon and heated to 50° C. during agitation. Next, 1 ml 1% aqueous V50 solution is added. After 6 hours, the temperature is increased to 60° C. and 3 ml 10% V50 solution are added. The polymerisation is ended after a further 2 hours.

Example 17

142 g 50% aqueous AAm solution, 37 g 80% aqueous ADAM-BQ solution, 5 g stabiliser poly-DADMAC, block copolyether-modified (HLB 6.9, 10 mole %), 5 g stabiliser poly-(ADAM-MQ/ADAM-BQ)-b-PEG, 200 g 30% aqueous poly-TMAPMA solution, 5 g 10% EDTA solution, 10 g glycerine and 595 g water are degassed in a reactor with argon and heated to 50° C. during agitation. Next, 1 ml 1% aqueous V50 solution is added. After 6 hours, the temperature is increased to 60° C. and 3 ml 10% V50 solution are added. The polymerisation is ended after a further 2 hours.

Example 18

142 g 50% aqueous AAm solution, 37 g 80% aqueous ADAM-BQ solution, 10 g stabiliser poly-DADMAC, block copolyether-modified (HLB 6.9. 10 mole %), 150 g 40% aqueous poly-DADMAC solution, 5 g 10% EDTA solution, 10 g glycerine and 645 g water are degassed in a reactor with argon and heated to 50° C. during agitation. Next, 1 ml 1% aqueous V50 solution is added. After 6 hours, the temperature is increased to 60° C. and 3 ml 10% V50 solution are added. The polymerisation is ended after a further 2 hours.

Example 19

142 g 50% aqueous AAm solution, 37 g 80% aqueous ADAM-BQ solution, 10 g stabiliser poly-(ADAM-MQ/ADAM-BQ)-b-PEG, 150 g 40% aqueous poly-DADMAC solution, 5 g 10% EDTA solution, 10 g glycerine and 645 g water are degassed in a reactor with argon and heated to 50° C. during agitation. Next, 1 ml 1% aqueous V50 solution is added. After 6 hours, the temperature is increased to 60° C. and 3 ml 10% V50 solution are added. The polymerisation is ended after a further 2 hours.

Example 20

142 g 50% aqueous AAm solution, 37 g 80% aqueous ADAM-BQ solution, 5 g stabiliser poly-DADMAC, block copolyester-modified (HLB 6.9, 10 mole %), 5 g stabiliser poly-(ADAM-MQ/ADAM-BQ)-b-PEG, 150 g 40% aqueous poly-DADMAC solution, 5 g 10% EDTA solution, 10 g glycerine and 645 g water are degassed in a reactor with argon and heated to 50° C. during agitation. Next, 1 ml 1% aqueous V50 solution is added. After 6 hours, the temperature is increased to 60° C. and 3 ml 10% V50 solution are added. The polymerisation is ended after a further 2 hours.

Example 21

213 g 50% aqueous AAm solution, 45 g 80% aqueous ADAM-BQ solution, 5 g stabiliser poly-DADMAC, block copolyether-modified (HLB 6.9, 10 mole %), 5 g stabiliser poly-(ADAM-MQ/ADAM-BQ)-b-PEG, 75 g 40% aqueous poly-DADMAC solution, 100 g 30% aqueous poly-TMAPMA solution, 5 g 10% EDTA solution, 10 g glycerine and 530.5 g water are degassed in a reactor with argon and heated to 50° C. during agitation. Next, 1 ml 1% aqueous V50 solution is added. After 1, 2, 3, 4, 5 hours, respectively 2.1 g 80% aqueous ADAM-BQ solution are added in doses. After 6 hours, the temperature is increased to 60° C. and 3 ml 10% V50 solution are added. The polymerisation is ended after a further 2 hours.

Example 22

213 g 50% aqueous AAm solution, 45 g 80% aqueous ADAM-BQ solution, 5 g stabiliser poly-DADMAC, block copolyether-modified (HLB 6.9, 10 mole %), 5 g stabiliser poly-(ADAM-MQ/ADAM-BQ)-b-PEG, 112.5 g 40% aqueous poly-DADMAC solution, 150 g 30% aqueous poly-TMAPMA solution, 5 g 10% EDTA solution, 10 g glycerine and 443 g water are degassed in a reactor with argon and heated to 50° C. during agitation. Next, 1 ml 1% aqueous V50 solution is added. After 1, 2, 3, 4, 5 hours, respectively 2.1 g 80% aqueous ADAM-BQ solution are added in doses. After 6 hours, the temperature is increased to 60° C. and 3 ml 10% V50 solution are added. The polymerisation is ended after a further 2 hours.

Example 23

142 g 50% aqueous AAm solution, 37 g 80% aqueous ADAM-BQ solution, 5 g stabiliser poly-DADMAC, block copolyether-modified (HLB 6.9, 10 mole %), 5 g stabiliser poly-(ADAM-MQ/ADAM-BQ)-b-PEG, 112.5 g 40% aqueous poly-DADMAC solution, 150 g 30% aqueous poly-TMAPMA solution, 5 g 10% EDTA solution, 10 g glycerine and 353.5 g water are degassed in a reactor with argon and heated to 50° C. during agitation. Next, 1 ml 1% aqueous V50 solution is added. After 5 hours, a mixture of 142 g 50% aqueous AAm solution and 37 g 80% aqueous ADAM-BQ solution are added in doses over 10 hours. After 18 hours, the temperature is increased to 60° C. and 3 ml 10% V50 solution are added. The polymerisation is ended after a further 2 hours.

Example 24

Application Test

Application tests regarding retention and dewatering in papermaking processes were made. To a furnish of 4 g/L with a conductivity of 7 mS/cm was added a polymer dispersion both according to the invention and a similar commercial available polymer dispersion as a reference which contained no co-stabiliser D.

The turbidity (NTU) and the retention time (s) was measured at different polymer loads.

Two different polymer dispersions (I) and (II) according to the invention were tested. The first polymer dispersion (I) was produced according to the procedure described in Example 2, but with an aqueous poly-DADMAC solution used instead of the poly-TMAPMA solution, and the amount monomers A and B, and stabilisers C and co-stabilisers D, selected so that the ratio C+D/A+B is about 0.5. The active content was 32 weight %

The second polymer dispersion (II) was produced according to the general procedure described in, Example 2, but with the amount monomers A and B, and stabilisers C and co-stabilisers D, selected so that the ratio C+D/A+B is about 0.5. according to Example 22. The active content was 26 weight %.

The retention/dewatering tests were made at two different test occasions, thus with different furnish batches.

TABLE 1

Tests with polymer dispersion (I).

| Polymer dispersion | Ratio stabiliser(s)/ polymer, (C + D)/(A + B) | Polymer load (kg/t) | Application test | |
|---|---|---|---|---|
| | | | Turbidity (NTU) | Retention time (s) |
| I | 0.5 | 0.5 | 47 | 11.8 |
| I | 0.5 | 1.0 | 27 | 7.2 |
| Reference (comparative) | 1.2 | 0.5 | 52 | 12.5 |
| Reference (comparative) | 1.2 | 1.0 | 34 | 10.0 |

TABLE 2

Tests with polymer dispersion (II).

| Polymer dispersion | Ratio stabiliser(s)/ polymer, (C + D)/(A + B) | Polymer load (kg/t) | Application test | |
|---|---|---|---|---|
| | | | Turbidity (NTU) | Retention time (s) |
| II | 0.5 | 0.5 | 60 | 11.6 |
| II | 0.5 | 1.0 | 48 | 7.8 |
| Reference (comparative) | 1.2 | 0.5 | 70 | 14.2 |
| Reference (comparative) | 1.2 | 1.0 | 66 | 12.0 |

The process viscosity was lower than 3000 mPas for both dispersions according to the invention. It is concluded that the dispersions using dispersants according to the invention show excellent results in retention and dewatering.

Example 25

The shelf life, measured as sedimentation stability, was tested for the polymer dispersions (I) and (II) of Example 24. Samples of the dispersions were centrifuged for 30 minutes at 3000 rpm. The amount of polymer sediment was determined for each sample.

TABLE 3

| Polymer dispersion | Sedimentation stability | |
|---|---|---|
| | Active content (%) | Amount polymer sediment (%) |
| I | 32 | 0 |
| II | 26 | 0 |

It is concluded that polymer dispersions with long shelf life can be obtained by the present invention, also at high active contents.

The invention claimed is:

1. Water-soluble polymer dispersion comprising:
   a dispersed polymer made up of:
   from about 50 to about 99 mole % of at least one water-soluble monomer A and from about 1 to about 50 mole % of at least one water-soluble cationic monomer B, from about 0.05 to about 10 weight % of at least one copolymer as polymer stabiliser C, from about 1 to about 25 weight % of at least one cationic polyelectrolyte as co-stabiliser D, relative respectively to the total mass of the dispersion, the polymer dispersion having no substantial amount of an inorganic polyvalent anion salt present,
   wherein the polymer stabiliser C is a copolymer comprising:
   at least one monomer, selected from the group diallyldimethylammonium chloride (DADMAC), vinylpyridinium chloride, N-vinylimidazoline chloride, vinylbenzyltrimethylammonium chloride and mixtures thereof, and/or
   compounds of the general formula II, and at least one of compounds of the general formulas III, IV or V, wherein
   (i) general formula II is

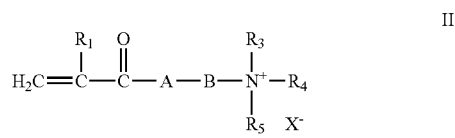

with
   $R_1$=H, or methyl,
   $R_3$, $R_4$, $R_5$=independently of each other H, alkyl ($C_1$-$C_8$), benzyl, or alkylbenzyl
   A=NH, O,
   B=alkyl ($C_1$-$C_{10}$) or hydroxyalkyl ($C_1$-$C_{10}$),
   $X^-$=an anionic counterion
   (ii) general formula III is a monofunctionally allyl-terminal polyether:

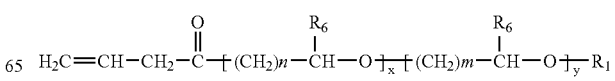

with
R$_1$=H, or methyl,
R$_6$=independently of each other H, methyl, or ethyl,
n=1 or 3,
x=5 to 50, and
y=5 to 50,
(iii) general formula IV is a macroinitiator:

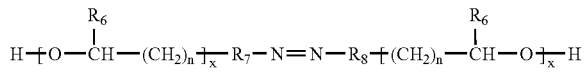

with
R$_1$=H, or methyl,
R$_6$=independently of each other H, methyl, or ethyl,
R$_7$, R$_8$=independently of each other alkyl, cyanoalkyl, carbalkoxyalkyl, (C$_1$-C$_8$), n=1 or 3 and
x=5 to 100, and
(iv) general formula V is a monofunctionally vinyl-terminal polyether:

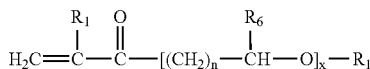

with
R$_1$=H, or methyl,
R$_6$=H, methyl, or ethyl,
n=1 or 3 and
x=5 to 50.

2. Water-soluble polymer dispersion according to claim 1 comprising from about 75 to about 99 mole % of the at least one water-soluble monomer A and from about 1 to about 25 mole % of the at least one water-soluble cationic monomer B.

3. Water-soluble polymer dispersion according to claim 1 comprising from about 5 to about 40 weight % of the dispersed polymer.

4. Water-soluble polymer dispersion according to claim 1, wherein the mass ratio of stabilisers and co-stabilisers to the dispersed polymer is:

$$\frac{C+D}{A+B} < 1.$$

5. Water-soluble polymer dispersion according to claim 1, wherein the dispersed polymer has a weight average molecular weight of at least 1.000.000 g/mole.

6. Water-soluble polymer dispersion according to claim 1, wherein the monomer A is a compound of the general formula I

with
R$_1$=H, or methyl,
R$_2$=H, methyl, ethyl, isopropyl, methyloyl, hydroxyethyl, or 2-hydroxypropyl.

7. Water-soluble polymer dispersion according to claim 1, wherein the monomer B is a compound of the general formula II

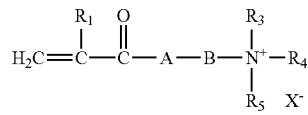

with
R$_1$=H, or methyl,
R$_3$, R$_4$, R$_5$=independently of each other H, alkyl (C$_1$-C$_8$), benzyl, or alkylbenzyl
A=NH, O,
B=alkyl (C$_1$-C$_{10}$) or hydroxyalkyl (C$_1$-C$_{10}$),
X$^-$=an anionic counterion.

8. Water-soluble polymer dispersion according to claim 1, wherein the dispersed polymer is present in a concentration between 10 to about 30% by weight relative to the total mass of the dispersion.

9. Water-soluble polymer dispersion according to claim 1, wherein the polymer stabiliser C has a molecular weight between 100.000 and 2.000.000 g/mole.

10. Water-soluble polymer dispersion according to claim 1, wherein the polymer stabiliser C has a molecular weight between 200.000 and 800.000 g/mole.

11. Water-soluble dispersion according to claim 1, wherein the polymer stabiliser C is present in a concentration between from about 0.1 to about 5 weight %.

12. Water-soluble polymer dispersion according to claim 1, wherein the co-stabiliser D is a cationic polyelectrolyte with a molecular weight between from about 2.000 to about 100.000 g/mole.

13. Water-soluble polymer dispersion according to claim 1, wherein the co-stabiliser D is a DADMAC polymer.

14. Water-soluble dispersion according to claim 1, wherein the polymer dispersion comprises from about 3 to about 15 weight % of the co-stabiliser D.

15. Method of producing a water-soluble polymer dispersion comprising polymerising from about 50 to about 99 mole % of at least one water-soluble monomer A and from about 1 to about 50 mole % of at least one water-soluble cationic monomer B, in the presence of from about 0.05 to about 10 weight % of a polymer stabiliser C and from about 1 to about 25 weight % of a cationic polyelectrolyte as co-stabiliser D, relative respectively to the total mass of the dispersion, implemented in a reaction medium with no substantial amount of an inorganic polyvalent anion salt present, wherein the polymer stabiliser C is a copolymer comprising:
at least one monomer, selected from the group diallyldimethylammonium chloride (DADMAC), vinylpyridinium chloride, N-vinylimidazoline chloride, vinylbenzyltrimethylammonium chloride and mixtures thereof, and/or
compounds of the general formula II, and at least one of compounds of the general formulas III, IV or V, wherein (i) general formula II is $$\begin{array}{c} R_1 \quad O \quad\quad R_3 \\ | \quad\quad || \quad\quad | \\ H_2C=C-C-A-B-N^+-R_4 \\ \quad\quad\quad\quad\quad\quad | \\ \quad\quad\quad\quad\quad\quad R_5 \quad X^- \end{array} \quad\quad II$$

with
$R_1$=H, or methyl,
$R_3$, $R_4$, $R_5$=independently of each other H, alkyl ($C_1$-$C_8$), benzyl, or alkylbenzyl
A=NH, O,
B=alkyl ($C_1$-$C_{10}$) or hydroxyalkyl ($C_1$-$C_{10}$),
$X^-$=an anionic counterion (ii) general formula III is a monofunctionally allyl-terminal polyether:

$$\begin{array}{c} O \quad\quad\quad\quad R_6 \quad\quad\quad R_6 \\ || \quad\quad\quad\quad | \quad\quad\quad\quad | \\ H_2C=CH-CH_2-C-[(CH_2)_n-CH-O]_x-[(CH_2)_m-CH-O]_y-R_1 \end{array} \quad III$$

with
$R_1$=H, or methyl,
$R_6$=independently of each other H, methyl, or ethyl,
n=1 to 3,
x=5 to 50, and
y=5 to 50, (iii) general formula IV is a macroinitiator:

$$\begin{array}{c} R_6 \quad\quad\quad\quad\quad\quad\quad\quad\quad\quad\quad R_6 \\ | \quad\quad\quad\quad\quad\quad\quad\quad\quad\quad\quad\quad | \\ H-[O-CH-(CH_2)_n]_x-R_7-N=N-R_8-[(CH_2)_n-CH-O]_x-H \end{array} \quad IV$$

with
$R_1$=H, or methyl,
$R_6$=independently of each other H, methyl, or ethyl,
$R_7$, $R_8$=independently of each other alkyl, cyanoalkyl, carbalkoxyalkyl, ($C_1$-$C_8$), n=1 or 3 and
x=5 to 100, and (iv) general formula V is a monofunctionally vinyl-terminal polyether:

$$\begin{array}{c} R_1 \quad O \quad\quad\quad\quad R_6 \\ | \quad\quad || \quad\quad\quad\quad | \\ H_2C=C-C-[(CH_2)_n-CH-O]_x-R_1 \end{array} \quad V$$

with
$R_1$=H, or methyl,
$R_6$=H, methyl, or ethyl,
n=1 or 3 and
x=5 to 50.

16. Method according to claim 15, wherein from about 75 to about 99 mole % of the at least one water-soluble monomer A and from about 1 to about 25 mole % of the at least one water-soluble cationic monomer B is polymerised.

17. Method according to claim 15, wherein the polymer dispersion comprises from about 5 to about 40 weight % of the dispersed polymer.

18. Method according to claim 15, wherein the mass ratio of stabilisers and co-stabilisers to the dispersed polymer is:

$$\frac{C+D}{A+B} < 1.$$

19. Method according to claim 15, wherein the dispersed polymer has a weight average molecular weight of at least 1.000.000 g/mole.

20. Method according to claim 15, wherein the monomer A is a compound of the general formula I $$\begin{array}{c} R_1 \quad O \quad H \\ | \quad\quad || \quad | \\ H_2C=C-C-N-R_2 \end{array} \quad I$$

with
$R_1$=H, or methyl,
$R_2$=H, methyl, ethyl, isopropyl, methyloyl, hydroxyethyl, or 2-hydroxypropyl.

21. Method according to claim 15, wherein the monomer B is a compound of the general formula II $$\begin{array}{c} R_1 \quad O \quad\quad R_3 \\ | \quad\quad || \quad\quad | \\ H_2C=C-C-A-B-N^+-R_4 \\ \quad\quad\quad\quad\quad\quad | \\ \quad\quad\quad\quad\quad\quad R_5 \quad X^- \end{array} \quad II$$

with
$R_1$=H, or methyl,
$R_3$, $R_4$, $R_5$=independently of each other H, alkyl ($C_1$-$C_8$), benzyl, or alkylbenzyl
A=NH, O,
B=alkyl ($C_1$-$C_{10}$) or hydroxyalkyl ($C_1$-$C_{10}$),
$X^-$=an anionic counterion.

22. Method according to claim 15, wherein the dispersed polymer is present in a concentration between 10 to about 30% by weight relative to the total mass of the dispersion.

23. Method according to claim 15, wherein the polymer stabiliser C has a molecular weight between 200.000 and 800.000 g/mole.

24. Method according to claim 15, wherein the polymer stabiliser C is present in a concentration between from about 0.1 to about 5 weight %.

25. Method according to claim 15, wherein the co-stabiliser D has a molecular weight between from about 2.000 to about 100.000 g/mole.

26. Method according to claim 15, wherein the co-stabiliser D is a DADMAC polymer.

27. Method according to claim 15, wherein the polymer dispersion comprises from about 3 to about 15 weight % of the co-stabiliser D.

28. Water-soluble dispersion according to claim 1, wherein the polymer stabiliser C is a co-polymer of the monomers DADMAC, ADAM MQ and PEG acrylate.

29. Water-soluble dispersion according to claim 1, wherein the monofunctionally vinyl-terminal polyether according to general formula V is a PEG acrylate.

30. Method according to claim 15, wherein the polymer stabiliser C is a co-polymer of the monomers DADMAC, ADAM MQ and PEG acrylate.

31. Method according to claim 15, wherein the monofunctionally vinyl-terminal polyether according to general formula V is a PEG acrylate.

* * * * *

UNITED STATES PATENT AND TRADEMARK OFFICE
CERTIFICATE OF CORRECTION

PATENT NO. : 7,408,004 B2
APPLICATION NO. : 10/514854
DATED : August 5, 2008
INVENTOR(S) : Oliver Struck et al.

It is certified that error appears in the above-identified patent and that said Letters Patent is hereby corrected as shown below:

Title Page, Item (54) (Title): "WATER SOLUBLE-POLYMER DISPERSION AND METHOD OF PRODUCING A WATER-SOLUBLE POLYMER DISPERSION"

should read -- WATER-SOLUBLE POLYMER DISPERSION AND METHOD OF PRODUCING A WATER-SOLUBLE POLYMER DISPERSION --

Title Page, Item (73) Assignee: "Akzo Nobel, N.V., Arnhem (NL)"

should read -- Akzo Nobel, N.V., Arnhem (NL)

Fraunhofer-Gesellschaft Zur Forderung Der Angewandten Forschung E.V. --

Title Page 1, Item (57) ABSTRACT, Line 4: "stabiliserC,and"

should read -- stabiliser C, and --

Claim 1, column 12, line 65:

"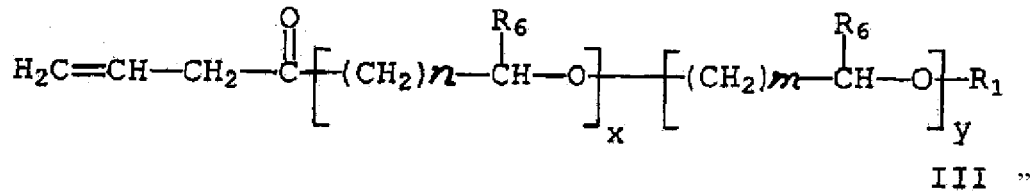
III "

should read

Signed and Sealed this
First Day of May, 2012

David J. Kappos
*Director of the United States Patent and Trademark Office*

CERTIFICATE OF CORRECTION (continued)

U.S. Pat. No. 7,408,004 B2

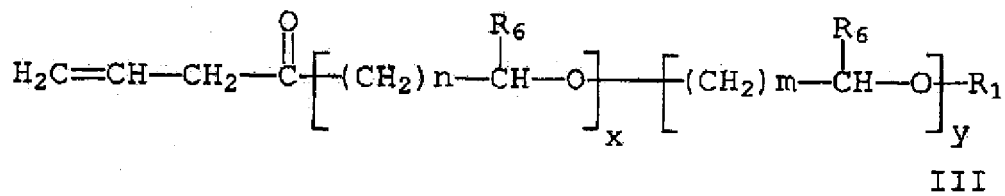

Claim 4, column 13, line 48:

" $$\frac{C + D}{A + B} < 1$$ "

should read $$\frac{C + D}{A + B} < 1$$

Claim 15, column 15, line 24:

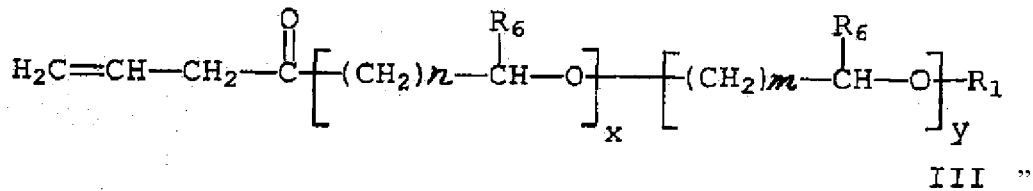

should read

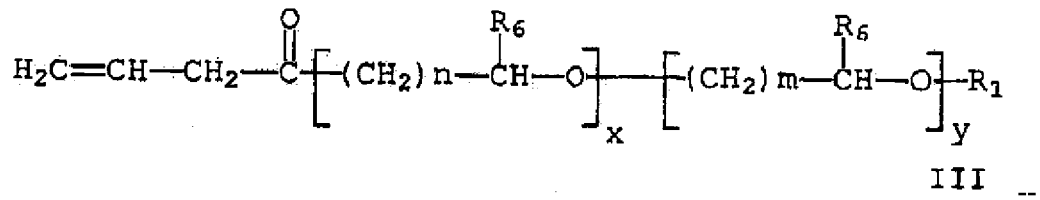

Claim 18, column 16, line 5:

" $$\frac{C + D}{A + B} < 1$$ "

should read $$\frac{C + D}{A + B} < 1$$

UNITED STATES PATENT AND TRADEMARK OFFICE
CERTIFICATE OF CORRECTION

PATENT NO. : 7,408,004 B2  
APPLICATION NO. : 10/514854  
DATED : August 5, 2008  
INVENTOR(S) : Oliver Struck et al.

Page 1 of 2

It is certified that error appears in the above-identified patent and that said Letters Patent is hereby corrected as shown below:

Title Page, Item (54) and at  
Column 1, lines 1-3 (Title):     "WATER SOLUBLE-POLYMER DISPERSION AND METHOD OF PRODUCING A WATER-SOLUBLE POLYMER DISPERSION"

should read     -- WATER-SOLUBLE POLYMER DISPERSION AND METHOD OF PRODUCING A WATER-SOLUBLE POLYMER DISPERSION --

Title Page, Item (73) Assignee:     "Akzo Nobel, N.V., Arnhem (NL)"

should read     -- Akzo Nobel, N.V., Arnhem (NL)

Fraunhofer-Gesellschaft Zur Forderung Der Angewandten Forschung E.V. --

Title Page 1, Item (57) ABSTRACT, Line 4:     "stabiliserC,and"

should read     -- stabiliser C, and --

Claim 1, column 12, line 65:

" 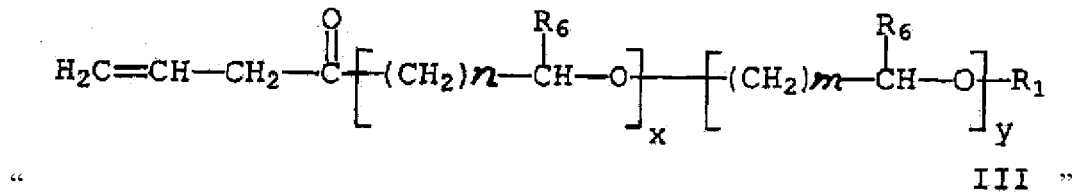
III "

This certificate supersedes the Certificate of Correction issued May 1, 2012.

Signed and Sealed this  
Twenty-ninth Day of May, 2012

David J. Kappos  
*Director of the United States Patent and Trademark Office*

CERTIFICATE OF CORRECTION (continued)
U.S. Pat. No. 7,408,004 B2 should read

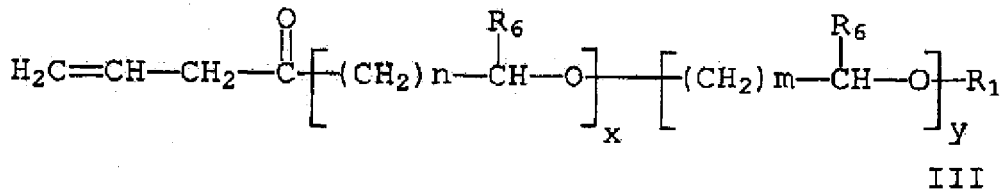

Claim 4, column 13, line 48:

" $$\frac{C + D}{A + B} < 1$$ "

should read

-- $$\frac{C + D}{A + B} < 1$$ --

Claim 15, column 15, line 24:

" 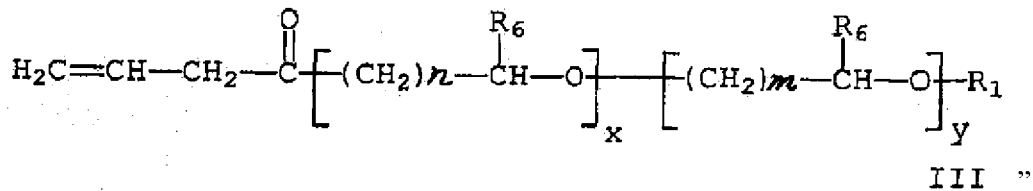 "

should read

-- 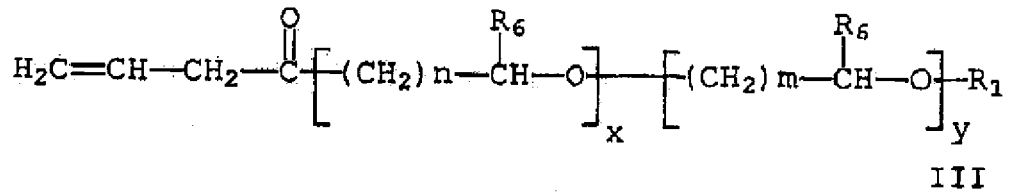 --

Claim 18, column 16, line 5:

" $$\frac{C + D}{A + B} < 1$$ "

should read

-- $$\frac{C + D}{A + B} < 1$$ --